T. A. HALL.
AUTOMOBILE TIRE.
APPLICATION FILED JULY 10, 1912.
1,140,591. Patented May 25, 1915.
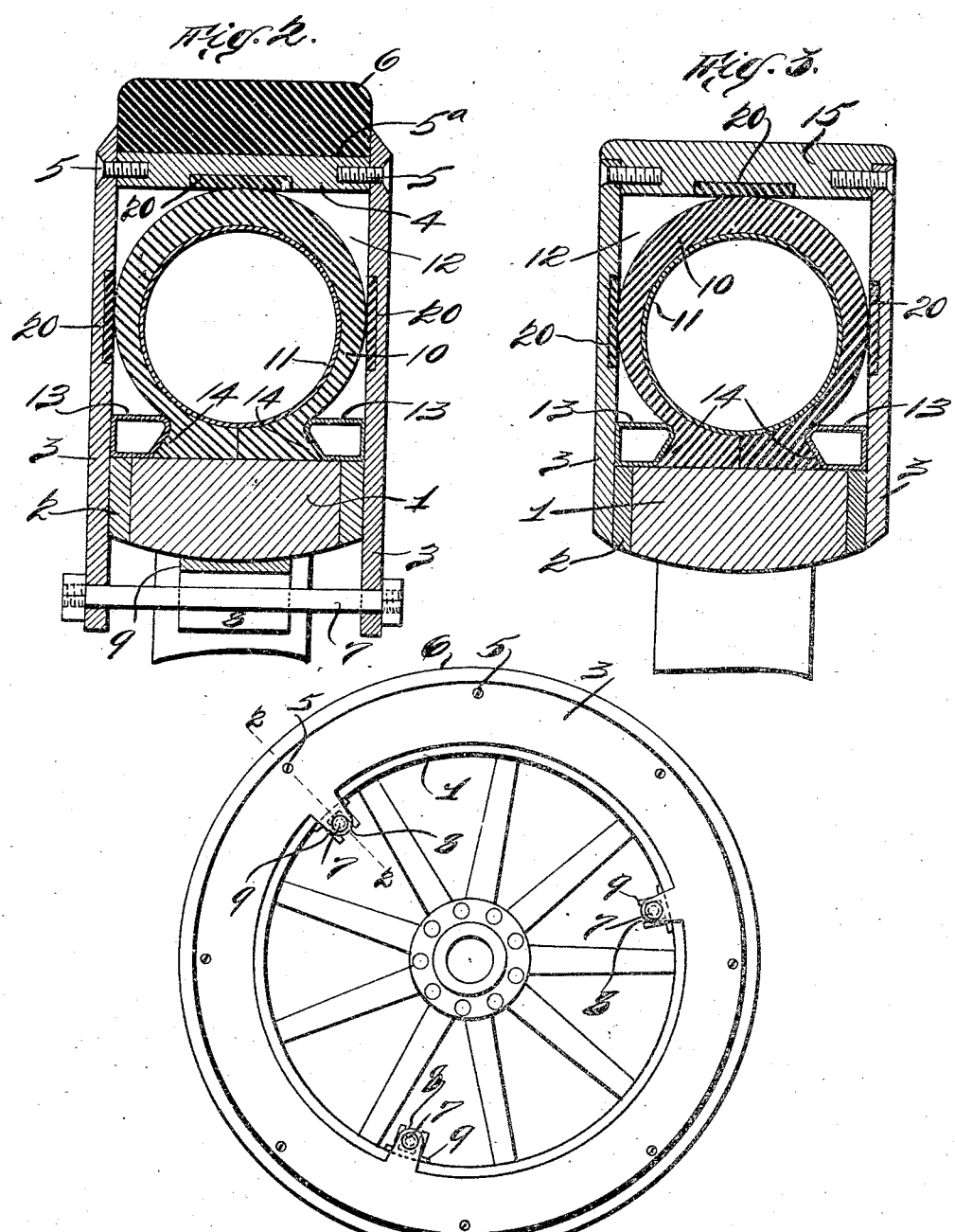

UNITED STATES PATENT OFFICE.

TRYGVE A. HALL, OF CLEVELAND, OHIO.

AUTOMOBILE-TIRE.

1,140,591.   Specification of Letters Patent.   Patented May 25, 1915.

Application filed July 10, 1912. Serial No. 708,582.

*To all whom it may concern:*

Be it known that I, TRYGVE A. HALL, a subject of the King of Sweden, residing at Cleveland, in the State of Ohio, have invented certain new and useful Improvements in Automobile-Tires, of which the following is a clear, full, and exact description.

This invention relates to an improvement in vehicle tires of the cushion or pneumatic variety.

The object of this invention is to provide a tire combining the features and advantages of the solid and pneumatic tires. In other words my improved tire is non-puncturable, but yet resilient.

To carry out the object of my invention I employ a solid tread portion, preferably made out of rubber and a cushion for said tread preferably pneumatic, and interposed a metal ring or band between the said two elements.

In the drawings which form part of this specification: Figure 1 is a side view of a vehicle wheel equipped with my improved tire. Fig. 2 is an enlarged cross sectional view taken on a line 2—2 in Fig. 1; and Fig. 3 is a similar view of a modified form of my improved tire.

In the drawing, 1 indicates the felly portion of a wheel, the out faces of which are provided with wear plates 2. The wear plates 2 contact with side plates or rings 3 adjacent to the periphery of which is secured a circular bed plate or band 4, preferably metal, by means of machine screws 5. It will be seen in Fig. 1 that the peripheral edges of the rings or plates 3 project beyond the ring 4 to form an annular seat 5ª to receive and hold the tread portion, which is preferably made out of solid rubber. The side plates or rings 3 are kept in contact with the wear plates 2, and in position upon the wheel, by means of bolts 7, which pass through the ears on the side plates and through a jaw 8 of a bracket 9 secured to the inner surface of the felly of the wheel. The bolts 7 are adapted to move in the said jaw longitudinally thereof, but bear against the walls of the said jaws, whereby the tire and wheel are rotatably connected. During the rotation of the wheel, under load, the tire will slide upon the wear plates, the load being resisted by a cushioning device which comprises a rubber case or shoe 10 containing an inflatable tube 11. The case or shoe is maintained in position in the annular chamber 12 by means of the filling rings 13 which are preferably hollow to reduce weight. The rings 13 fill the space between the side plates 3 and beading 14 of the case or shoe 10, whereby the cushioning element is prevented from shifting transversely of the chamber 12. A portion of the wall of the shoe 10 contacts with the inner surface of the side plates 3, while the periphery of the said shoe contacts with the under surface of the circular bed plate or band 4. The load upon the wheel is imparted to the cushioning device through the movable or slidable casing which contains the cushioning device, and which consists of the side plates 3 and attached bed-plate or band 4. The tire as illustrated in Fig. 3, is the same as illustrated in Fig. 2, excepting that the solid tread is omitted, the band 15 forming the tread.

To prevent any static electricity from being generated I prefer to insert in the plates 3 and rings 4 and 15 any suitable anti-frictional material 20, by which means the tire 10 is kept out of contact with the metal.

I claim as my invention:

In a vehicle wheel, in combination, a circular tread portion, a concentric wheel portion within the tread portion, a pneumatic tire between the two, a pair of circular plates secured at opposite sides to said tread portion and inclosing the tire and wheel portion and sliding on the latter within the limits of the resiliency of the tire, means securing the inner edges of the side plates freely movable within the wheel portion, clencher filling means between the side plates and the tire and resting freely upon the wheel portion, and inset wearing faces in the side plates and the tread portion tangent to the tire at the points of contact.

Signed at New York city in the county of New York and State of New York this 3 day of July, 1912.

TRYGVE A. HALL.

Witnesses:
 FRED F. WEISS,
 MABEL DITTENHOEFER.